United States Patent
Ido et al.

(10) Patent No.: US 8,715,579 B2
(45) Date of Patent: May 6, 2014

(54) HONEYCOMB STRUCTURE

(75) Inventors: Takahiko Ido, Ibi-Gun (JP); Yoshihiro Koga, Ibi-Gun (JP); Takumi Asanuma, Ibi-Gun (JP); Keisuke Tange, Ibi-Gun (JP)

(73) Assignee: Ibiden Co., Ltd., Ogaki-shi (JP)

( * ) Notice: Subject to any disclaimer, the term of this patent is extended or adjusted under 35 U.S.C. 154(b) by 308 days.

(21) Appl. No.: 13/044,575

(22) Filed: Mar. 10, 2011

(65) Prior Publication Data

US 2011/0250097 A1   Oct. 13, 2011

(30) Foreign Application Priority Data

Apr. 9, 2010   (WO) .................. PCT/JP2010/056480

(51) Int. Cl.
*B01D 50/00*   (2006.01)
(52) U.S. Cl.
USPC .......................................... 422/174; 422/180
(58) Field of Classification Search
USPC ......................................... 422/174, 177, 180
See application file for complete search history.

(56) References Cited

U.S. PATENT DOCUMENTS

| | | | | |
|---|---|---|---|---|
| 3,982,100 A | * | 9/1976 | Hervert | 219/553 |
| 5,063,029 A | * | 11/1991 | Mizuno et al. | 422/175 |
| 5,569,455 A | * | 10/1996 | Fukui et al. | 422/174 |
| 5,588,292 A | * | 12/1996 | Hiraishi et al. | 60/300 |
| 5,733,352 A | * | 3/1998 | Ogawa et al. | 55/523 |
| 5,914,187 A | * | 6/1999 | Naruse et al. | 428/327 |
| 2004/0141890 A1 | | 7/2004 | Hirata et al. | |
| 2009/0291034 A1 | | 11/2009 | Ohno et al. | |
| 2010/0308849 A1 | * | 12/2010 | Bouteiller et al. | 324/700 |

FOREIGN PATENT DOCUMENTS

| | | |
|---|---|---|
| EP | 1441112 | 7/2004 |
| EP | 2127725 | 12/2009 |
| JP | 49-124412 U | 10/1974 |
| JP | 4-44424 U | 4/1992 |
| JP | 2002-309932 | 10/2002 |
| JP | 2002-349245 | 12/2002 |
| JP | 2006-26537 | 2/2006 |

OTHER PUBLICATIONS

Extended European Search Report for corresponding EP Application No. 11153502.7-1603, Apr. 4, 2013.

* cited by examiner

*Primary Examiner* — Tom Duong
(74) *Attorney, Agent, or Firm* — Ditthavong Mori & Steiner, P.C.

(57) ABSTRACT

A honeycomb structure has a substantially circular-pillar-shape. The honeycomb structure includes at least one electrically conductive honeycomb unit, a first electrode, and a second electrode. The at least one electrically conductive honeycomb unit includes walls extending along a longitudinal direction of the at least one electrically conductive honeycomb unit to define a plurality of through holes. The first electrode is provided on an outer circumferential surface of the honeycomb structure. The second electrode is provided in a vicinity of a central axis of the honeycomb structure extending along the longitudinal direction.

18 Claims, 6 Drawing Sheets

HONEYCOMB STRUCTURE

CROSS-REFERENCE TO RELATED APPLICATIONS

The present application claims priority under 35 U.S.C. §119 to International Application No. PCT/JP2010/056480, filed on Apr. 9, 2010, the entire contents of which are incorporated herein by reference.

BACKGROUND OF THE INVENTION

1. Field of the Invention

The present invention relates to a honeycomb structure.

2. Description of the Related Art

A large number of techniques have been developed in relation to conversion of automobile exhaust gas. With an increase in traffic, however, countermeasures taken against exhaust gas have hardly been satisfactory. Not only in Japan but also globally, is automobile emission control going to be further tightened.

In order to meet such control, a catalyst support capable of treating predetermined components contained in exhaust gas is used in exhaust gas systems. Further, a honeycomb structure is known as a member for such a catalyst support.

This honeycomb structure has, for example, multiple cells (through holes) extending from one to another of the end faces of the honeycomb structure along its longitudinal directions, and these cells are separated from each other by cell walls supporting a catalyst. Accordingly, in the case of causing exhaust gas to flow through this honeycomb structure, substances contained in the exhaust gas, such as HC (a hydrocarbon compound), CO (carbon monoxide), and NOx (nitrogen oxides), are converted (oxidized or reduced) by the catalyst supported by the cell walls, so that these components in the exhaust gas may be treated.

In general, the cell walls (base material) of such a honeycomb structure are formed of cordierite. Further, a catalyst support layer of γ-alumina is formed on the cell walls, and a catalyst of a noble metal such as platinum and/or rhodium is supported on this catalyst support layer.

Further, a technique has been proposed that, in order to improve conversion performance at exhaust gas temperatures lower than a temperature at which a catalyst becomes active, uses a honeycomb structure of a relatively low resistance and supplies the honeycomb structure with electric current via electrodes for voltage application provided on the honeycomb structure, thereby causing the honeycomb structure to perform self-heating (Japanese Laid-Open Utility Model Application No. 49-124412).

The entire contents of Japanese Laid-Open Utility Model Application No. 49-124412 are incorporated herein by reference.

SUMMARY OF THE INVENTION

According to one aspect of the present invention, a honeycomb structure has a substantially circular-pillar-shape. The honeycomb structure includes at least one electrically conductive honeycomb unit, a first electrode, and a second electrode. The at least one electrically conductive honeycomb unit includes walls extending along a longitudinal direction of the at least one electrically conductive honeycomb unit to define a plurality of through holes. The first electrode is provided on an outer circumferential surface of the honeycomb structure. The second electrode is provided in a vicinity of a central axis of the honeycomb structure extending along the longitudinal direction.

BRIEF DESCRIPTION OF THE DRAWINGS

Other objects, features and advantages of the present invention will become more apparent from the following detailed description when read in conjunction with the accompanying drawings, in which.

DESCRIPTION OF THE EMBODIMENTS

The embodiments will now be described with reference to the accompanying drawings, wherein like reference numerals designate corresponding or identical elements throughout the various drawings.

According to the conventional honeycomb structure described in Japanese Laid-Open Utility Model Application No. 49-124412, the honeycomb structure can be subjected to resistance heating by supplying the honeycomb structure with electric current via electrodes provided one at each end of the honeycomb structure.

In general, however, electric current tends to flow in the shortest path between electrodes. Therefore, the conventional honeycomb structure described in Japanese Laid-Open Utility Model Application No. 49-124412 is believed to have a problem in that electric current is less likely to flow so that temperature is less likely to rise at a position distant from the electrodes, that is, near the radial center portion of the honeycomb structure. It is believed that the presence of an insufficiently heated portion in the honeycomb structure is likely to prevent the catalyst from being fully activated, thus causing reduction in the exhaust gas conversion performance of the honeycomb structure.

According to embodiments of the present invention, it is possible to obtain a honeycomb structure that allows the entire honeycomb structure to be subjected to resistance heating with relative ease.

A description is given, with reference to the drawings, of an embodiment of the present invention.

[First Configuration]

Figure 1:
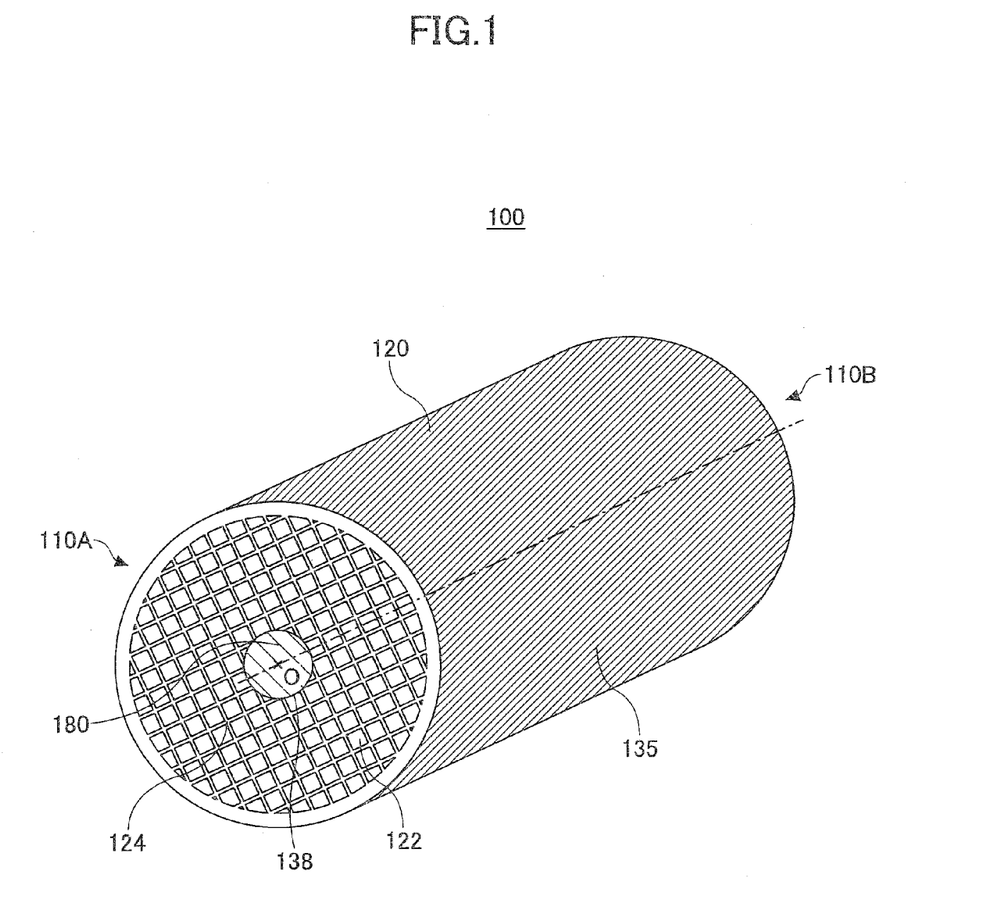
FIG. 1 is a perspective view typically illustrating a honeycomb structure according to an embodiment of the present invention.
Figure 2:
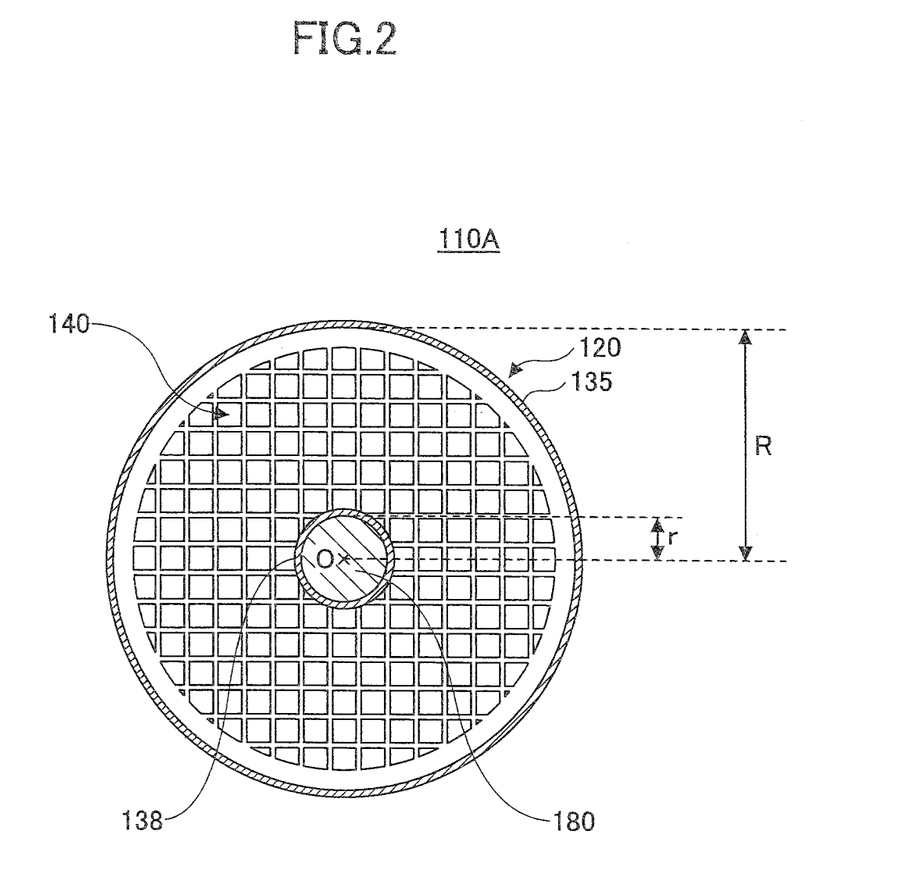
FIG. 2 is a plan view of an end face of the honeycomb structure illustrated in FIG. 1.

FIG. 1 typically illustrates a honeycomb structure 100 according to an embodiment of the present invention. Further, FIG. 2 is a plan view of an end face of the honeycomb structure 100 illustrated in FIG. 1.

As illustrated in FIG. 1, the honeycomb structure 100 according to the embodiment of the present invention has a single conductive honeycomb unit and includes two open end faces 110A and 110B and an exterior surface 120 connecting the end faces 110A and 110B. Further, the honeycomb structure 100 includes multiple cells (through holes) 122 and cell walls 124 defining the cells 122. The cells 122 extend from the end face 110A to the end face 110B along the longitudinal directions of the honeycomb structure 100 to be open at the end faces 110A and 110B.

The honeycomb structure 100 (conductive honeycomb unit) is formed of, for example, a material having silicon carbide (SiC) as a principal component, to which a small amount of a resistance adjusting component such as aluminum nitride (AlN) is further added in order to lower resistance. A catalyst is supported on the cell walls 124 of the honeycomb structure 100.

The honeycomb structure 100 has a substantially circular-pillar shape elongated along a central axis "O."

Here, as clearly illustrated in FIG. 2, the cells 122 and the cell walls 124 are not formed within the region of the distance of a radius "r" around the central axis "O." Instead, a metal bar 180 having a substantially circular-pillar shape is attached in this region. In other words, the honeycomb structure 100 includes the metal bar 180 disposed concentrically with the central axis "O" in its radial center portion and extending from the first end face 110A to the second end face 110B, and a region 140 external to the metal bar 180 (that is, a region constituted of the cells 122 and the cell walls 124) where exhaust gas may be introduced.

The honeycomb structure 100 has a first electrode 135 provided on the exterior surface 120. Further, the honeycomb structure 100 has a second electrode 138 provided at the interface between the metal bar 180 and the region 140 along the directions of the central axis "O." Accordingly, the metal bar 180 serves as part of a connection terminal for the second electrode 138.

Here, in such a conventional honeycomb structure as described in Japanese Laid-Open Utility Model Application No. 49-124412, the honeycomb structure is subjected to resistance heating by supplying the honeycomb structure with electric current via electrodes provided one on at each end of the honeycomb structure.

In general, however, it is believed that electric current tends to flow in the shortest path between electrodes. Therefore, the honeycomb structure having such a configuration has a problem in that electric current is less likely to flow so that temperature is less likely to rise at a position distant from the electrodes, that is, near the radial center portion of the honeycomb structure. It is believed that the presence of an insufficiently heated portion in the honeycomb structure is likely to prevent a catalyst supported by partition walls from being fully activated, thus causing reduction in the exhaust gas conversion performance of the honeycomb structure.

On the other hand, in the honeycomb structure 100 according to this embodiment of the present invention, the first electrode 135 is provided on the exterior surface 120 of the honeycomb structure 100, and the second electrode 138 is provided around the metal bar 180 provided in the radial center portion of the honeycomb structure 100. According to this configuration, when electric current is supplied, the electric current flows along the radial directions of the honeycomb structure. Accordingly, in the honeycomb structure 100 according to the embodiment of the present invention, it is believed that there is no occurrence of such a problem as in the conventional honeycomb structure that electric current is less likely to flow in the center portion so as to make it difficult to uniformly heat the entire honeycomb structure. That is, in the honeycomb structure 100 according to the embodiment of the present invention, it is possible to heat the entire honeycomb structure 100 more uniformly. Further, as a result, the catalyst supported by the cell walls (partition walls) 124 is likely to be fully activated over the entire honeycomb structure 100, thus making it possible to convert exhaust gas with more efficiency.

The radius "r" of the metal bar 180 is not limited to a particular value. However, the radius "R" of the honeycomb structure 100 and the radius "r" of the metal bar 180 are preferably in the ratio of approximately (4:1) to approximately (10:1). If the ratio of the radius "r" of the metal bar 180 to the radius "R" of the honeycomb structure 100 is too large, a cross-sectional area that contributes to exhaust gas conversion is likely to be relatively reduced. Further, if the ratio of the radius "r" of the metal bar 180 to the radius "R" of the honeycomb structure 100 is too small, the second electrode 138 and/or the metal bar 180 is likely to be overheated or damaged when a large current is supplied.

The material of the metal bar 180 is not limited in particular as long as the material is a metal. The metal bar 180 may be formed of, for example, stainless steel, a nickel-base alloy, etc.

The material and the provision method of the first and second electrodes 135 and 138 are not limited in particular. The first and second electrodes 135 and 138 are formed of, for example, an electrically conductive material such as metal. Further, the first electrode 135 may be provided by, for example, metal spraying, sputtering, vapor deposition, etc. Likewise, the second electrode 138 may be provided by, for example, metal spraying using a small-diameter spray gun, application of slurry by pouring, etc.

Thus, according to the embodiment of the present invention, electrodes are formed near the central axis of the honeycomb structure and on the outer circumferential surface of the honeycomb structure, respectively, to form first and second electrodes. Accordingly, by causing electric current to flow through the first and second electrodes, the electric current flows throughout the cell walls of the honeycomb structure. Therefore, it is likely that it is possible to cause the entire honeycomb structure to generate heat uniformly.

Further, if the electrode (the second electrode) near the central axis of the honeycomb structure has a substantially cylinder shape, and the shape of the outer circumference of the honeycomb structure and the shape of the inner circumference of the electrode (the second electrode) near the central axis are substantially concentric circles in a cross section of the honeycomb structure perpendicular to its longitudinal directions, the distance between the substantially cylinder-shaped electrode (the second electrode) and the outer peripheral electrode (the first electrode) of the honeycomb structure is uniform, so that the electrical resistances of the honeycomb cells are substantially equal. Accordingly, when electric current is supplied, the amount of heat generation is likely to be uniform throughout the entire honeycomb structure.

[Second Configuration]

The honeycomb structure 100 illustrated in FIG. 1 is a honeycomb structure formed of a single conductive honeycomb unit, that is, has a so-called "monolithic structure." The embodiment of the present invention, however, may also be applied to a honeycomb structure formed of multiple conductive honeycomb units, that is, a honeycomb structure having a so-called "aggregated structure." The conductive honeycomb unit may also be referred to simply as "honeycomb unit."

Figure 3:
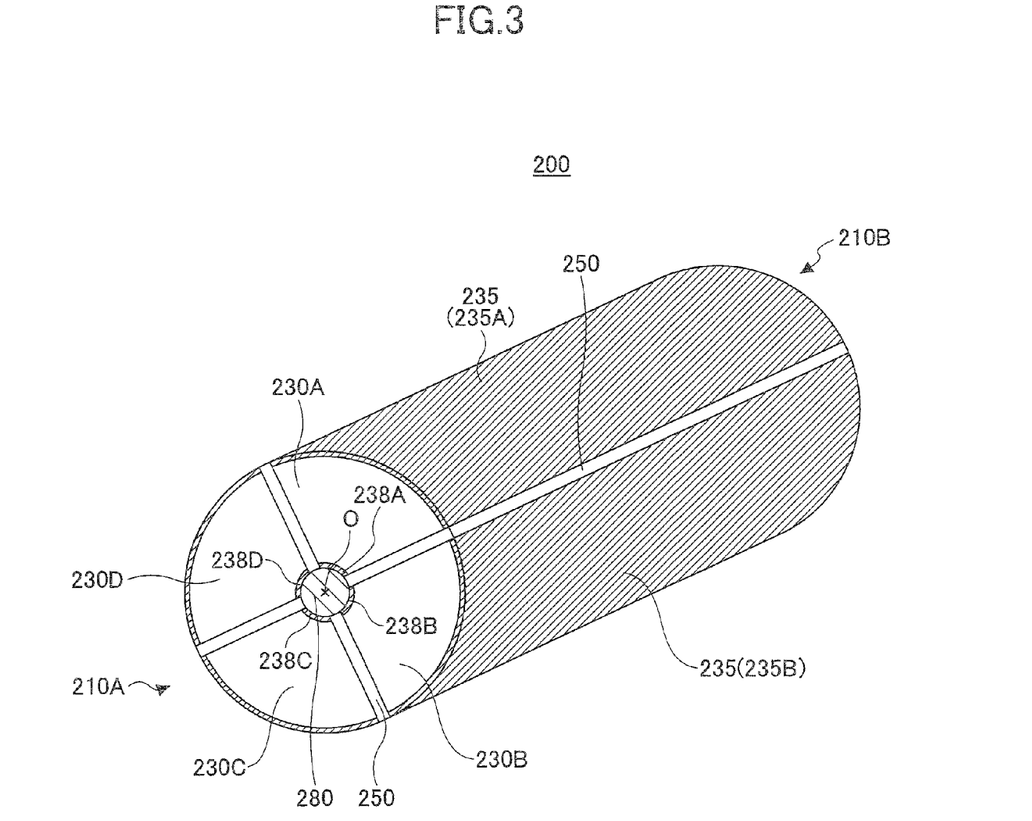
FIG. 3 is a perspective view typically illustrating another honeycomb structure according to the embodiment of the present invention.
Figure 4:
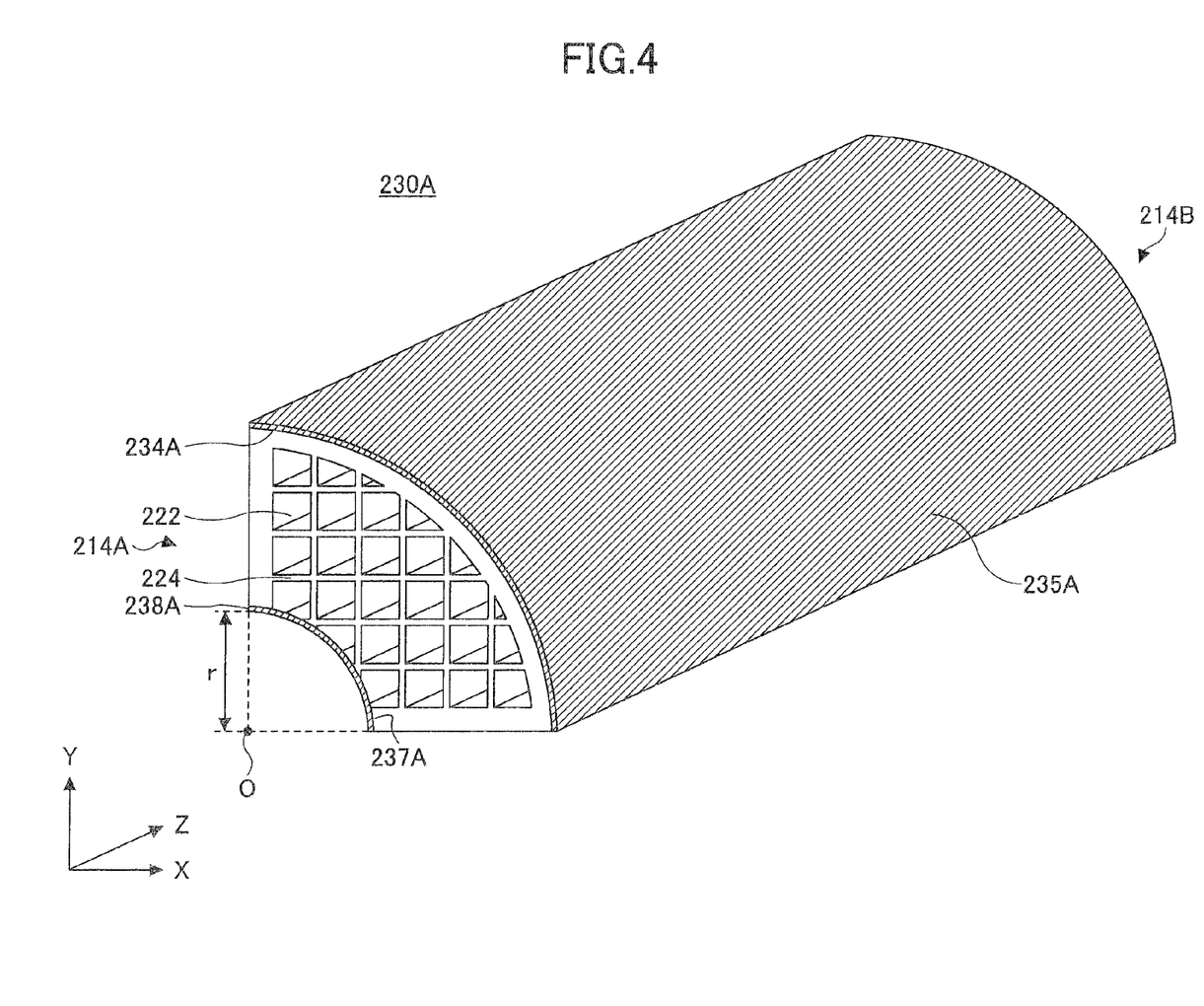
FIG. 4 is a perspective view typically illustrating a honeycomb unit of the honeycomb structure of FIG. 3.

FIG. 3 illustrates a honeycomb structure 200 of "aggregated structure" according to the embodiment of the present invention. Further, FIG. 4 illustrates a typical honeycomb unit of the honeycomb structure 200 illustrated in FIG. 3.

As illustrated in FIG. 3, the honeycomb structure 200 according to the embodiment of the present invention has two open end faces 210A and 210B. Further, the honeycomb structure 200 has a first electrode 235 provided at its exterior surface except for where a below-described adhesive layer 250 is provided.

Further, the honeycomb structure 200 has a metal bar 280 in its center portion, the metal bar 280 extending from the end face 210A to the end face 210B along a central axis "O."

The honeycomb structure 200 is formed by joining multiple honeycomb units by interposing the adhesive layer 250. For example, in the case illustrated in FIG. 3, the honeycomb structure 200 includes four honeycomb units 230A through 230D.

As illustrated in FIG. 4, the honeycomb unit 230A has a pillar structure having end faces 214A and 214B having a substantially sectorial shape of a substantially quarter circle. However, the honeycomb unit 230A is hollow in a region within the distance of a radius "r" from the center of the substantially sectorial shape, where an interior surface 237A having the side shape of a substantially quarter circular-pillar is formed. Accordingly, the honeycomb unit 230A has four sides in total—an exterior curved surface 234A, the interior curved surface 237A, and two substantially rectangular, substantially flat sides.

In the case of FIG. 3, the honeycomb units 230B through 230D have substantially the same shape as the honeycomb unit 230A.

The honeycomb unit 230A includes multiple cells 222 and cell walls 224 defining the cells 222. The cells 222 extend from the end face 214A to the end face 214B along the longitudinal directions of the honeycomb unit 230A to be open at the end faces 214A and 214B. The honeycomb unit 230A is formed of, for example, a material having silicon carbide (SiC) as a principal component, to which a small amount of a resistance adjusting component such as aluminum nitride (AlN) is added in order to lower resistance. A catalyst is provided on the cell walls 224 of the honeycomb unit 230A.

A first electrode 235A is provided over the substantially entire exterior curved surface 234A of the honeycomb unit 230A. Further, a second electrode 238A is provided over the substantially entire interior curved surface 237A of the honeycomb unit 230A.

The honeycomb structure 200 is formed by combining the honeycomb units 230A through 230D so that the first electrodes 235A through 235D on the curved surfaces 234A through 234D of the honeycomb units 230A through 230D form the exterior surface of the honeycomb structure 200. Further, the metal bar 280 is attached in the substantially circular-pillar-shaped space formed by the second electrodes 238A through 238D on the interior surfaces 237A through 237D of the honeycomb units 230A through 230D so as to be in contact with the second electrodes 238A through 238D.

It is clear to a person having ordinary skill in the art that the above-described effects according to the embodiment of the present invention are also produced by this honeycomb structure 200.

[Third Configuration]

Figure 5:
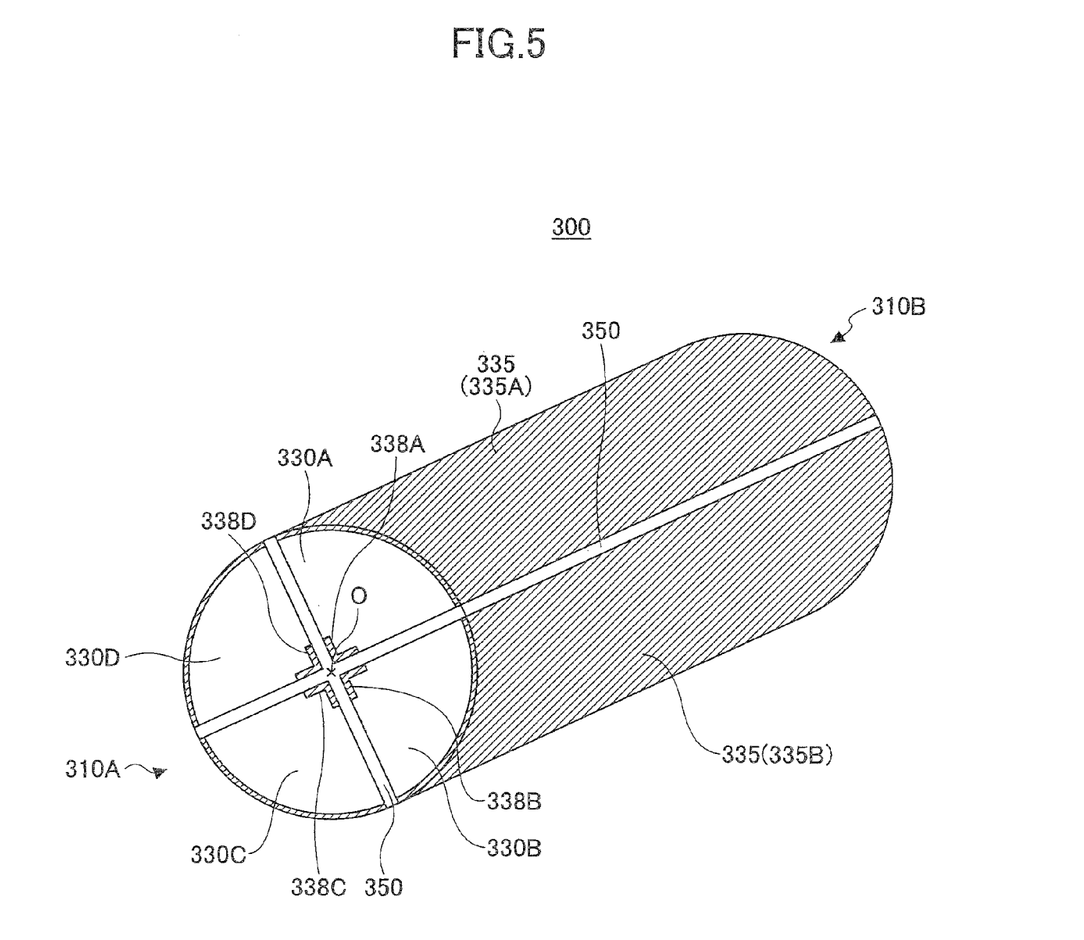
FIG. 5 is a perspective view typically illustrating yet another honeycomb structure according to the embodiment of the present invention.
Figure 6:
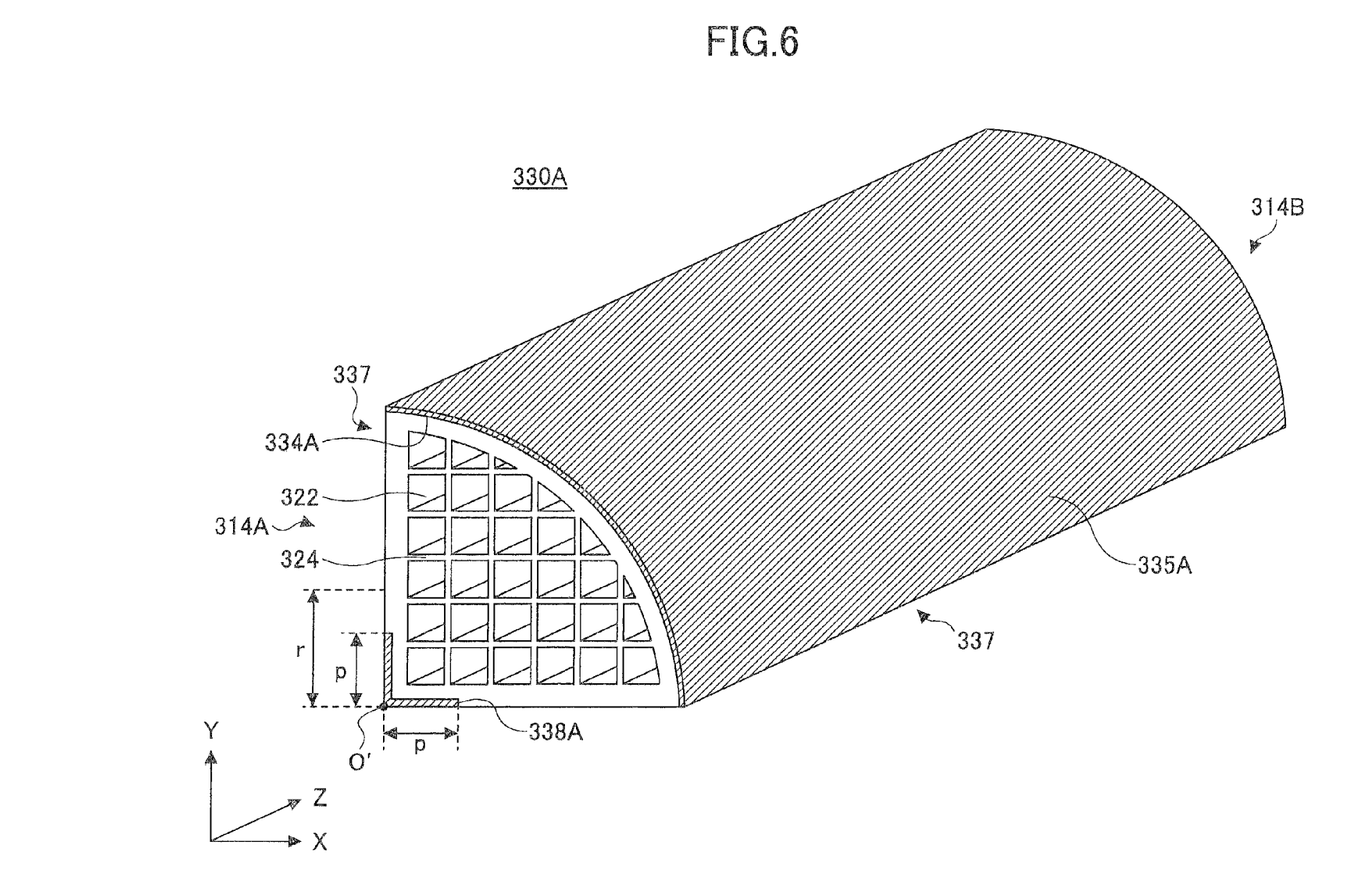
FIG. 6 is a perspective view typically illustrating a honeycomb unit of the honeycomb structure of FIG. 5.

Next, a description is given, with reference to FIG. 5 and FIG. 6, of yet another honeycomb structure according to the embodiment of the present invention. FIG. 5 is a perspective view typically illustrating yet another honeycomb structure according to the embodiment of the present invention. FIG. 6 is a perspective view typically illustrating a honeycomb unit of the honeycomb structure of FIG. 5.

As illustrated in FIG. 5, a honeycomb structure 300 includes two open end faces 310A and 310B. Further, the honeycomb structure 300 has a first electrode 335 provided at its exterior surface except for where an adhesive layer 350 is provided.

The honeycomb structure 300 is formed by joining multiple conductive honeycomb units by interposing the adhesive layer 350. The conductive honeycomb unit may also be referred to simply as "honeycomb unit." For example, in the case illustrated in FIG. 5, the honeycomb structure 300 includes four honeycomb units 330A through 330D.

As illustrated in FIG. 6, the honeycomb unit 330A has a pillar structure having end faces 314A and 314B having a substantially sectorial shape of an approximately quarter circle.

Here, unlike the above-described honeycomb unit 230A, the honeycomb unit 330A has a substantially quarter circular-pillar shape. That is, the sides of the honeycomb unit 330A include an exterior curved surface 334A and two rectangular flat faces 337. Here, a line at which the two rectangular flat faces 337 intersect is referred to as the central axis "O'" of the honeycomb unit 330A. In other words, the honeycomb structural body substantially has the shape of a prism, a straight cylinder or an elliptical cylinder, i.e. a substantially straight cylinder having a substantial ellipse as a base. Two substantial semi-cylinders can be connected. The fan-like shape can be described by a combination of plural parts of prisms or cylinders being connected with each other, each part having a part of a substantial circle or a substantial ellipse, for example, substantially a half or substantially a quarter of a substantial circle or a substantial ellipse as a base.

In the case of FIG. 5, the honeycomb units 330B through 330D have substantially the same shape as the honeycomb unit 330A.

The honeycomb unit 330A includes multiple cells 322 and cell walls 324 defining the cells 322. The cells 322 extend from the end face 314A to the end face 314B along the longitudinal directions of the honeycomb unit 330A to be open at the end faces 314A and 314B. The honeycomb unit 330A is formed of, for example, a material having silicon carbide (SiC) as a principal component, to which a small amount of a resistance adjusting component such as aluminum nitride (AlN) is added in order to lower resistance. A catalyst is supported on the cell walls 324 of the honeycomb unit 330A.

A first electrode 335A is provided over the substantially entire exterior curved surface 334A of the honeycomb unit 330A. Further, a second electrode 238A is provided in the honeycomb unit 330A along and near the central axis "O'" in a substantially L-letter shape.

More specifically, the second electrode 338A extends in a range of a length "p" along each of the flat faces 337 from the central axis "O'" of the honeycomb unit 330A in planes perpendicular to the central axis "O'" of the honeycomb unit 330A. Further, in the directions of the central axis "O'" of the honeycomb unit 330A, the second electrode 338A extends substantially entirely over the honeycomb unit 330A from the first end face 314A to the second end face 314B. Thus, the honeycomb structure is formed by joining a plurality of pillar-shaped honeycomb units having a cross section of a substantially sectorial shape perpendicular to the longitudinal direction, and in a periphery of each of the plurality of pillar-shaped honeycomb units, an electrode is formed in a vicinity of an intersection line formed by an intersection of two flat faces to define a central angle of the substantially sectorial shape, and another electrode is formed on a curved surface to define an arc of the substantially sectorial shape.

The honeycomb structure 300 is formed by combining the honeycomb units 330A through 330D so that the first electrodes 335A through 335D on the curved surfaces 334A through 334D of the honeycomb units 330A through 330D form the exterior surface of the honeycomb structure 300.

It is clear to a person having ordinary skill in the art that the above-described effects according to the embodiment of the present invention are also produced by this honeycomb structure 300.

In particular, in the case of this configuration of the embodiment of the present invention, an electrode is formed in part of two flat faces of a honeycomb unit. Accordingly, it is likely that provision of the electrode does not reduce the number of cells to perform catalytic reaction. It is believed that in the above-described cases of using a substantially cylinder-shaped electrode as the electrode near the central axis, no cells generate heat inside the substantially cylinder-shaped electrode, resulting in no contribution to catalytic reaction. Further, in the case of providing a rod-shaped electrode, the part of the rod-shaped electrode becomes a dead space where no cells are present, so that an effective volume for catalytic reaction is likely to be reduced.

On the other hand, in the case of the third configuration of the embodiment of the present invention, the electrodes are formed at the periphery of a honeycomb unit. Therefore, a dead space is less likely to be caused, so that it is likely that it is possible to ensure a sufficient effective volume for catalytic reaction.

[Details of Honeycomb Structure]

Next, a description is given in more detail of a configuration of each of members of a honeycomb structure according to the embodiment of the present invention. In the following, a description is given principally of members of the honeycomb structure 200 having the structure illustrated in FIG. 3. However, it is clear to a person having ordinary skill in the art that part of the description may also be applied to the honeycomb structure 100 having the structure illustrated in FIG. 1. Further, in FIG. 3, the honeycomb units 230A through 230D have substantially the same configuration. Accordingly, the honeycomb unit 230A is taken here, and a description is given of its configuration.

[Honeycomb Unit]

The resistance of the honeycomb unit 230A as a whole is preferably approximately $1\Omega$ to approximately $10^3\Omega$ at room temperature (for example, 25° C.). This is likely to allow the honeycomb structure 200 to be sufficiently heated even if the voltage applied across the electrodes 235A and 238A is, for example, approximately a voltage value of a normal battery in hybrid vehicles. If the resistance of the honeycomb unit 230A is more than or equal to approximately $1\Omega$, a sufficient amount of heat generation is likely to be obtained.

The honeycomb unit 230A is formed of an inorganic material based on silicon carbide (SiC) or the like, and if needed, a small amount of a resistance adjusting component such as aluminum nitride (AlN) is added.

The cross-sectional shape of the honeycomb unit 230A perpendicular to its longitudinal directions is not limited in particular, and may be any shape. However, the cross-sectional shape of each honeycomb unit is determined so that a substantially circular-pillar-shaped honeycomb structure is obtained when the honeycomb units are combined to form the honeycomb structure. Further, the cross-sectional shape of each honeycomb unit is determined so that a space that allows attachment of a substantially circular-pillar-shaped metal bar is available in the center portion of the honeycomb structure when the honeycomb units are combined to form the honeycomb structure.

The cell density of the honeycomb unit 230A is preferably approximately 15.5 cells/cm$^2$ to approximately 186 cells/cm$^2$ (approximately 100 cpsi to approximately 1200 cpsi), more preferably approximately 46.5 cells/cm$^2$ to approximately 170 cells/cm$^2$ (approximately 300 cpsi to approximately 1100 cpsi), and still more preferably approximately 62 cells/cm$^2$ to approximately 155 cells/cm$^2$ (approximately 400 cpsi to approximately 1000 cpsi).

The porosity of the honeycomb unit 230A is preferably approximately 10% to approximately 60%.

The thickness of the cell walls 224 of the honeycomb unit 230A is not limited in particular. However, the lower limit is preferably approximately 0.1 mm in terms of the strength of the honeycomb unit, and the upper limit is preferably approximately 0.4 mm in terms of the conversion performance of the honeycomb structure.

The catalyst supported on the cell walls 224 of the honeycomb unit 230A is not limited in particular, and, for example, platinum, rhodium, palladium, etc., may be used. The catalyst may be supported on the cell walls 224 by interposing an aluminum layer.

[Adhesive Layer]

The adhesive layer 250 of the honeycomb structure 200 is formed using adhesive layer paste as its raw material. The adhesive layer paste may contain inorganic particles, an inorganic binder, inorganic fibers, and/or an organic binder.

Silicon carbide (SiC) is desirable as inorganic particles of the adhesive layer paste.

Inorganic sol, a clay-based binder, etc., may be used as the inorganic binder. Examples of the inorganic sol include alumina sol, silica sol, titania sol, water glass and the like. Examples of the clay-based binder include clays such as clay, kaolin, montmonrillonite, sepiolite, attapulgite and the like. These may be used alone or in combination.

Of these, alumina sol, silica sol, titania sol, water glass, sepiolite, or attapulgite is desirable.

Further, alumina, silica, silicon carbide, silica-alumina, glass, potassium titanate, aluminum borate or the like is desirable as the material of the inorganic fibers. These inorganic fibers may be used alone or in combination. Of these, silica-alumina is particularly desirable.

The organic binder is not limited in particular. Examples of the organic binder include polyvinyl alcohol, methylcellulose, ethylcellulose, carboxymethylcellulose, etc. Of the organic binders, carboxymethylcellulose is desirable.

The thickness of the adhesive layer 250 is preferably approximately 0.3 mm to approximately 2 mm. If the thickness of the adhesive layer 250 is more than or equal to approximately 0.3 mm, sufficient joining strength of the honeycomb units is likely to be obtained. If the thickness of the adhesive layer 250 is less than or equal to approximately 2 mm, the pressure loss of the honeycomb structure is less likely to increase. The number of honeycomb units to be joined is suitably selected in accordance with the size of the honeycomb structure.

[Honeycomb Structure]

The honeycomb structure 200 according to the embodiment of the present invention has a substantially circular-pillar shape. The material of the metal bar 280 provided in the center portion is not limited in particular as long as the material is an electrically conductive material such as metal.

[Method of Manufacturing Honeycomb Structure]

Next, a description is given briefly of a method of manufacturing a honeycomb structure according to the embodiment of the present invention. In the following, a description is given of a method of manufacturing the honeycomb structure 200 illustrated in FIG. 3. However, it is clear that a person having ordinary skill in the art may manufacture the honeycomb structure 100 illustrated in FIG. 1 from this description.

[Manufacture of Honeycomb Unit]

First, honeycomb unit molded bodies are made by extrusion molding or the like using raw material paste having inorganic particles including silicon carbide (SiC) as a principal component. The honeycomb unit molded bodies have, for example, a pillar body shape having a cross section of a substantially sectorial shape with a center "O" side portion cut off, the center side portion having a cross section of a smaller substantially sectorial shape, as illustrated in FIG. 4. That is, the honeycomb unit molded bodies have four sides including cross sections of a substantially quarter circle shape, an exterior curved surface, and an interior curved surface.

A suitable amount of aluminum nitride (AlN) or the like may be further added to the raw material paste in order to adjust the resistivity of the honeycomb unit.

In addition to these, an organic binder, a dispersion medium, and a molding aid may be suitably added to the raw material paste in accordance with moldability. The organic binder is not limited in particular. The organic binder includes one or more organic binders selected from, for example, methylcellulose, carboxymethylcellulose, hydroxyethylcellulose, polyethylene glycol, phenolic resin, epoxy resin, etc. The amount of the organic binder blended is preferably approximately 1 to approximately 10 parts by weight to the total of 100 parts by weight of the inorganic particles, inorganic binder, and inorganic fibers.

The dispersion medium is not limited in particular, and may be, for example, water, an organic solvent (such as benzene), alcohol (such as methanol), etc. The molding aid is not limited in particular, and may be, for example, ethylene glycol, dextrin, a fatty acid, fatty acid soap, polyalcohol, etc.

The raw material paste is not limited in particular, and is preferably subjected to mixing and kneading. For example, the raw material paste may be mixed using a mixer, attritor or the like, and may be well kneaded with a kneader or the like. The method of molding the raw material paste is not limited in particular. It is preferable, for example, to form the raw material paste into a shape having cells by extrusion molding or the like.

Next, it is preferable to dry the obtained molded bodies. The drying apparatus used for drying is not limited in particular, and may be a microwave drying apparatus, a hot air drying apparatus, a dielectric drying apparatus, a reduced-pressure drying apparatus, a vacuum drying apparatus, a freeze drying apparatus, etc. Further, it is preferable to degrease the obtained molded bodies. The conditions for degreasing, which are not limited in particular and are suitably selected in accordance with the kind and amount of the organic matter included in the molded bodies, are preferably approximately 400° C. and approximately two hours. Further, it is preferable to subject the obtained molded bodies to firing. The condition for firing, which is not limited in particular, is preferably approximately 2200° C.

[Formation of Electrodes]

Next, electrodes are provided on the exterior curved surface and the interior curved surface of each honeycomb unit. Here, a first electrode is provided on the substantially entire exterior curved surface, and a second electrode is provided on the substantially entire interior curved surface.

As described above, the material and the provision method of electrodes are not limited in particular. The first and second electrodes are formed of, for example, a metal. Further, the first and second electrodes may be provided by, for example, metal spraying, sputtering, vapor deposition, application of slurry by pouring, etc.

The electrodes are preferably approximately 1 µm to approximately 200 µm in thickness, for example.

[Assembly of Honeycomb Structure]

Thereafter, a catalyst is supported on the cell walls of each honeycomb unit.

Next, adhesive layer paste to later become an adhesive layer is applied on a side of a honeycomb unit obtained in the above-described process to be uniform in thickness, and thereafter, another honeycomb unit is successively joined to the honeycomb unit by interposing this adhesive layer paste. This process is repeated so that a substantially circular-pillar-shaped honeycomb structure hollowed in the center is manufactured.

Next, this honeycomb structure is heated to dry and solidify the adhesive layer paste, thereby forming an adhesive layer and fixing the honeycomb units to each other.

It is preferable to degrease this honeycomb structure after joining the honeycomb units with the adhesive layer. As a result of this degreasing treatment, if an organic binder is included in the adhesive layer paste, this organic binder can be removed by degreasing. The conditions for degreasing, which are suitably determined in accordance with the kind and amount of the included organic material, are preferably approximately 700° C. and approximately two hours.

Next, a metal bar is provided in the center portion of the honeycomb structure to be in contact with the electrode portions of the honeycomb units. The metal bar does not necessarily have to be provided at this stage. For example, the metal bar may be provided in the process of joining the honeycomb units by interposing the adhesive layer paste.

By the above-described process, a honeycomb structure according to the embodiment of the present invention can be manufactured.

Obviously, numerous modifications and variations of the present invention are possible in light of the above teachings. It is therefore to be understood that within the scope of the appended claims, the invention may be practiced otherwise than as specifically described herein.

What is claimed is:

1. A honeycomb structure having a substantially circular-pillar-shape, comprising:
    at least one electrically conductive honeycomb unit comprising:
        walls extending along a longitudinal direction of the at least one electrically conductive honeycomb unit to define a plurality of through holes;
    a first electrode having a membranous shape and provided on an outer circumferential surface of the honeycomb structure; and
    a second electrode having a membranous shape and provided in a vicinity of a central axis of the honeycomb structure extending along the longitudinal direction,
    wherein the honeycomb structure has a region which is hollow and which is within a distance of a certain radius from a center of the substantially circular-pillar-shape,
    wherein the honeycomb structure has an exterior curved surface which defines the substantially circular-pillar-shape of the honeycomb structure, an interior curved surface which defines the region,
    wherein the first electrode is provided over a substantially entire exterior curved surface,
    wherein the second electrode is provided over a substantially entire interior curved surface,
    wherein the honeycomb structure is formed of a plurality of electrically conductive honeycomb units bonded by interposing an adhesive layer, and wherein each of the first electrode and the second electrode is formed in each of the plurality of electrically conductive honeycomb units.

2. The honeycomb structure as claimed in claim 1, wherein an outer circumferential shape of the honeycomb structure and an inner circumferential shape of the second electrode are substantially concentric circles in a cross section of the honeycomb structure perpendicular to the longitudinal direction.

3. The honeycomb structure as claimed in claim 1, wherein a metal bar is attached in said region.

4. The honeycomb structure as claimed in claim 3, wherein a radius of the honeycomb structure and a radius of the metal bar are in a ratio of approximately (4:1) to approximately (10:1).

5. The honeycomb structure as claimed in claim 3, wherein the metal bar comprises one of stainless steel and a nickel-base alloy.

6. The honeycomb structure as claimed in claim 1, wherein a ratio of a diameter of an inner circle formed by the second electrode to a diameter of an outer circle of the honeycomb structure in a cross section of the honeycomb structure perpendicular to the longitudinal direction is less than or equal to approximately ¼.

7. The honeycomb structure as claimed in claim 1, wherein a resistance between the first electrode and the second electrode is approximately $1\Omega$ to approximately $10^3\Omega$ in the at least one electrically conductive honeycomb unit.

8. The honeycomb structure as claimed in claim 1, wherein the first electrode and the second electrode are formed by one of spraying and sputtering.

9. The honeycomb structure as claimed in claim 1, wherein a catalyst is supported on the walls of the at least one electrically conductive honeycomb unit.

10. The honeycomb structure as claimed in claim 9, wherein the catalyst comprises one of platinum, rhodium, and palladium, and
wherein the catalyst is supported on the walls by interposing an aluminum layer.

11. The honeycomb structure as claimed in claim 1, wherein the at least one electrically conductive honeycomb unit includes silicon carbide as a principal component.

12. The honeycomb structure as claimed in claim 1, wherein the at least one electrically conductive honeycomb unit has a resistance adjusting component added thereto.

13. The honeycomb structure as claimed in claim 12, wherein the resistance adjusting component comprises aluminum nitride.

14. The honeycomb structure as claimed in claim 1, wherein each of the first electrode and the second electrode comprises a metal.

15. The honeycomb structure as claimed in claim 14, wherein the first electrode is provided by one of metal spraying, sputtering, and vapor deposition, and
wherein the second electrode is provided by one of metal spraying using a small-diameter spray gun and application of slurry by pouring.

16. The honeycomb structure as claimed in claim 1, wherein the honeycomb structure includes four electrically conductive honeycomb units, and
wherein each of the four electrically conductive honeycomb units has a pillar structure having a plurality of end faces having a substantially sectorial shape of a substantially quarter circle.

17. The honeycomb structure as claimed in claim 1, wherein the first electrode is provided over a substantially entire exterior curved surface, and
wherein the second electrode is provided in the at least one electrically conductive honeycomb unit along and in the vicinity of the central axis thereof in a substantially L-letter shape.

18. A honeycomb structure having a substantially circular-pillar-shape, comprising:
at least one electrically conductive honeycomb unit comprising:
walls extending along a longitudinal direction of the at least one electrically conductive honeycomb unit to define a plurality of through holes;
a first electrode provided on an outer circumferential surface of the honeycomb structure; and
a second electrode provided in a vicinity of a central axis of the honeycomb structure extending along the longitudinal direction,
wherein the honeycomb structure is formed by joining a plurality of pillar-shaped honeycomb units having a cross section of a substantially sectorial shape perpendicular to the longitudinal direction, and
wherein in a periphery of each of the plurality of pillar-shaped honeycomb units, an electrode is formed in a vicinity of an intersection line formed by an intersection of two flat faces to define a central angle of the substantially sectorial shape, and another electrode is formed on a curved surface to define an arc of the substantially sectorial shape.

* * * * *